United States Patent [19]

O'Connell et al.

[11] 3,734,610

[45] May 22, 1973

[54] MICROFICHE VIEWER-COPIER WITH BILLING DATA STORAGE

[75] Inventors: Richard P. O'Connell; Edwin Zucker, both of Rochester, N.Y.

[73] Assignee: Xerox Corporation, Stamford, Conn.

[22] Filed: May 1, 1972

[21] Appl. No.: 248,840

[52] U.S. Cl. ....................355/40

[51] Int. Cl. ....................G03b 27/52

[58] Field of Search ....................355/40, 43; 340/172.5

[56] References Cited

UNITED STATES PATENTS 3,596,253 7/1971 Ruth et al. ....................340/172.5

3,672,769 6/1972 Ross ....................355/40

*Primary Examiner*—John M. Horan

*Assistant Examiner*—Michael L. Gellner

*Attorney*—James J. Ralabate et al.

[57] ABSTRACT

A microfiche viewer and copier provides for automatic random access to a desired microfiche card from a library, and automatic selection of a frame thereof for viewing. Copies of the selected frame or of a following sequence of frames may be made. Identification of each microfiche card and frame copied, the number of copies made, and the user is obtained and stored for billing and copyright royalty computation.

11 Claims, 5 Drawing Figures

MICROFICHE VIEWER-COPIER WITH BILLING DATA STORAGE

INTRODUCTION AND SUMMARY OF INVENTION

The present invention relates generally to a combined microfiche viewer and copier, and more particularly to a control system for a combined microfiche viewer and copier, wherein a desired microfiche card and frame is automatically selected from a microfiche library and displayed for viewing, and can then be copied to produce a macro printout of the selected frame. The control system provides for the printout of a desired number of copies of the selected frame, and for the printout of a desired sequence of microfiche frames in single or multiple copies. In addition, the control system provides for recording the identity of the fiche and frame copied and the number of copies made, and if desired, the identity of the user. This recorded information may be used for billing purposes, and for identification of copyright royalties.

Microfiche viewers are known, which are adapted to function in conjunction with a preestablished and properly coded library of microfiche cards, wherein a keyboard is provided for identifying a desired microfiche card from the library and a desired frame on that card. By actuating the appropriate keys to establish the code identity of a desired microfiche card, the identified card is automatically withdrawn from the library and positioned in the projection optics of the machine, and the selected card is then automatically positioned on its $x$ and $y$ axes in accordance with coordinates data established at the keyboard, to locate the selected frame of the card in the projection optics and project an image of said frame on the viewing screen of the machine. An example of such a machine currently available on the market is the CARD Reader Model 201, of HF Image Systems, Inc.

Microfiche copiers are also known which are adapted to copy a frame of a microfiche card positioned in the copier optics. One suitable type of copier is the electrostatic type document copier, wherein a projection of the selected frame is imaged on a charged photoconductive surface to produce a latent electrostatic image of the frame on the photoconductor. The latent image is then developed with an electroscopic toner, and the developed image is transfered to a receiving sheet of paper to provide a macro printout of the microfiche frame. These microfiche copiers are also provided with controls for selecting the number of printout copies of the frame to be automatically produced. Such prior art microfiche copiers are illustrated in U.S. Pat. Nos. 3,373,653 to R. R. Roberts, et al., and 3,400,631 to R. C. Rauscher. Further illustrative of suitable copying systems are U.S. Pat. Nos. 3,592,539 and 3,612,678 to P. Haslam,et al., and 3,547,533 to D. R. Stokes, et al.

In accordance with the present invention, an appropriate control system is provided, whereby a keyboard controlled random access microfiche selector and viewer as aforedescribed is combined with a microfiche copier, such as suggested above, to enable the automatic printout of microfiche frames selected with the random access viewer, and in addition, to utilize the access data to record the specific frames copied, the number of copies made, and the machine user, for machine use billing and copyright royalty payments.

It is therefore one object of the present invention to provide for the random access copying of a selected frame, or sequence of frames, from an access coded library of microfiche cards.

Another object of the present invention is to provide for the recording of the number of copies made.

A further object of the present invention is to provide for the recording of the identity of the specific frames copied.

And still another object of the invention is to provide for the recording of the identity of the user making the copies.

Other objects and advantages of the present invention will become apparent to those skilled in the art from a consideration of the following detailed description of one exemplary and illustrative embodiment of the invention, had in conjunction with the accompanying drawings, in which like reference characters refer to like or corresponding parts, and wherein:

DETAILED DESCRIPTION

Figure 1:
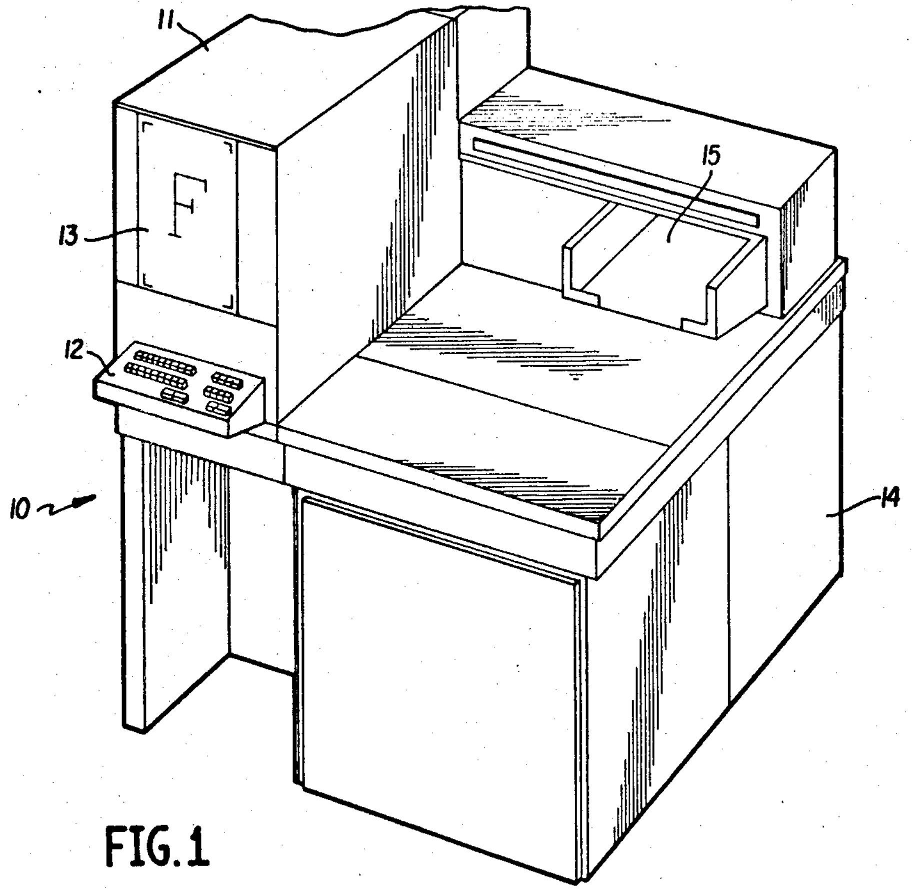
FIG. 1 is an external view of the microfiche viewer and copier.
Figure 2:
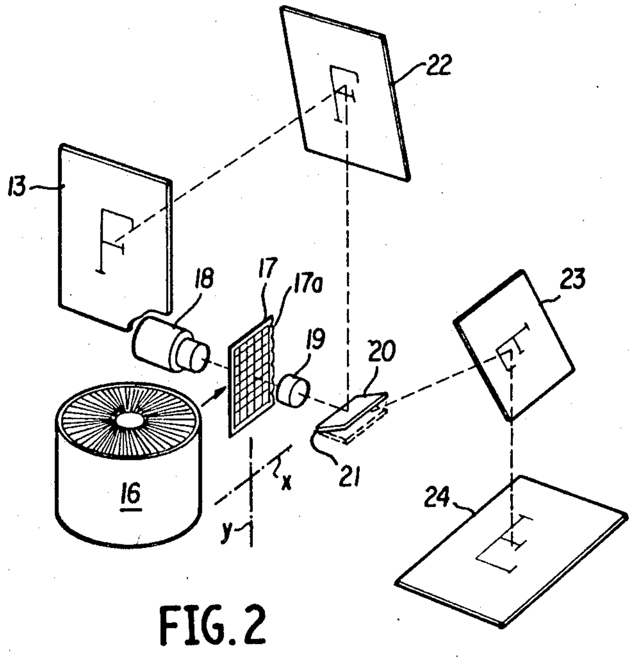
FIG. 2 is a schematic view of the optics of the microfiche viewer and copier.

Referring to FIG. 1, the overall machine housing 10 comprises the viewer section 11 including the microfiche selector and copier control panel 12 and a viewing screen 13 on which a selected microfiche frame is illustratively projected. The portion of the housing designated by the numeral 14 houses a copier, which delevers printout copies of the selected microfiche frame at 15. The optics of the system uniting the viewer and copier is schematically illustrated in FIG. 2. A carousel type microfiche library is schematically indicated at 16. A desired microfiche card 17 is indicated as having been selected and withdrawn from the carousel 16. The microfiche card 17 is coded along its edge 17*a* to enable identification of the card from the data fed in at the keyboard 12 by the user. The card is further adjusted to a specific spatial orientation along the indicated $x$ and $y$ axes to position a particular frame on the axis of the projection optics pursuant to the $x$ and $y$ coordinates data fed in at the keyboard 12. As hereinabove indicated, the mechanism for random access selection of the microfiche card and for positioning a desired frame thereof in the system optics, are all known in the art, and are therefore not described here. The projection optics comprises a projection lamp 18, a projection lens 19 and a first mirror 20. Mirror 20 is pivotable about axis 21 between the solid line and dotted line positions shown. When in the solid line position, the image of the selected microfiche frame projected by lens 19 is reflected upwardly to mirror 22 and thence to viewing screen 13. When mirror 20 is in its dotted line position, the image is reflected from mirror 20 to mirror 23 and thence imaged at plane 24, where the image is scanned by the copier onto a photoconductive surface, if an electrostatic copier is used.

Movement of mirror 20 between its solid and dotted line positions is accomplished by a control system hereinafter described.

Figure 3A:
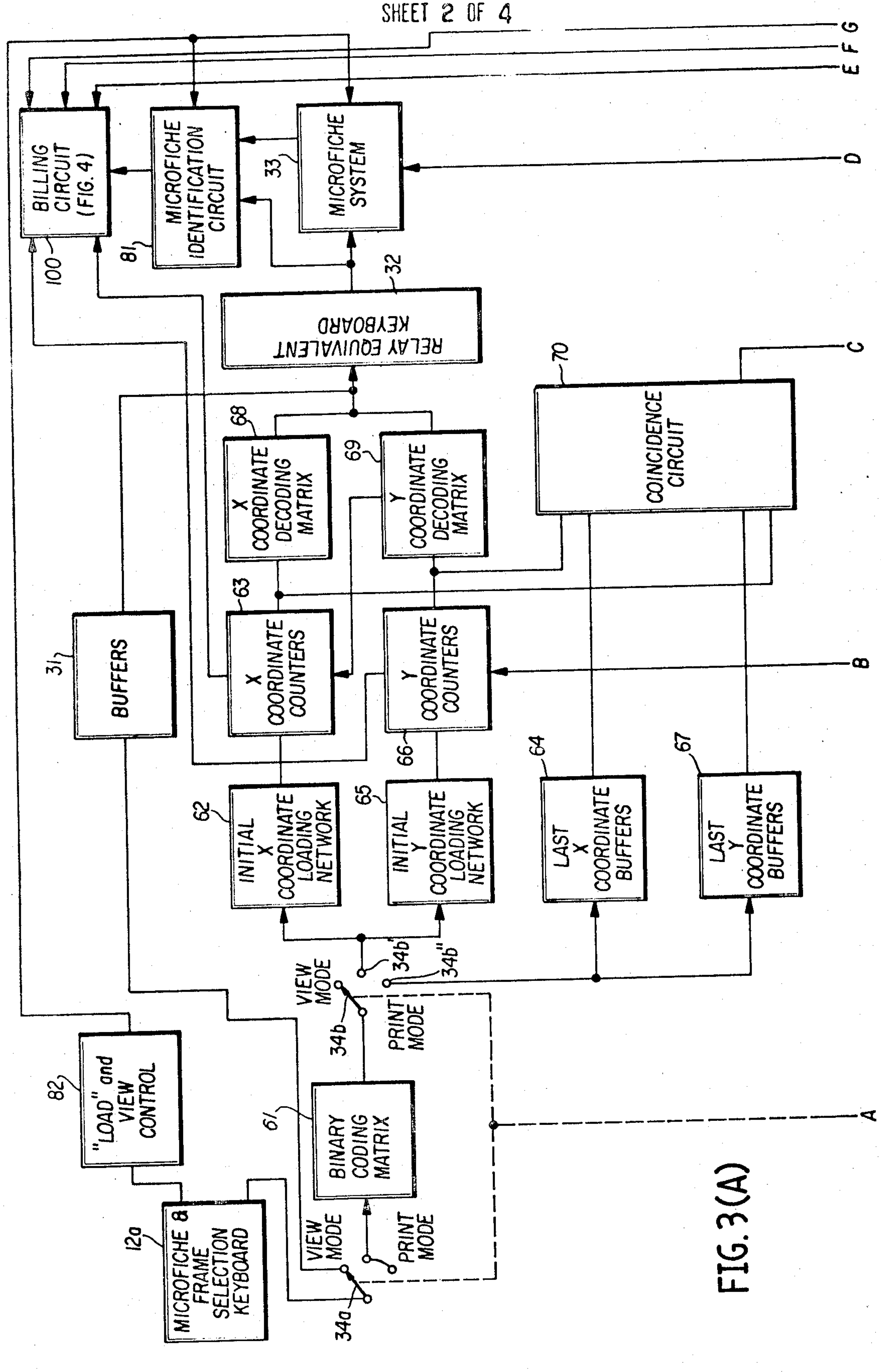
FIG. 3 is a block diagram of the control system for the microfiche viewer and copier, depicted in two parts 3A and 3B, with the interconnections therebetween identified by paired letters A through G.
Figure 3B:
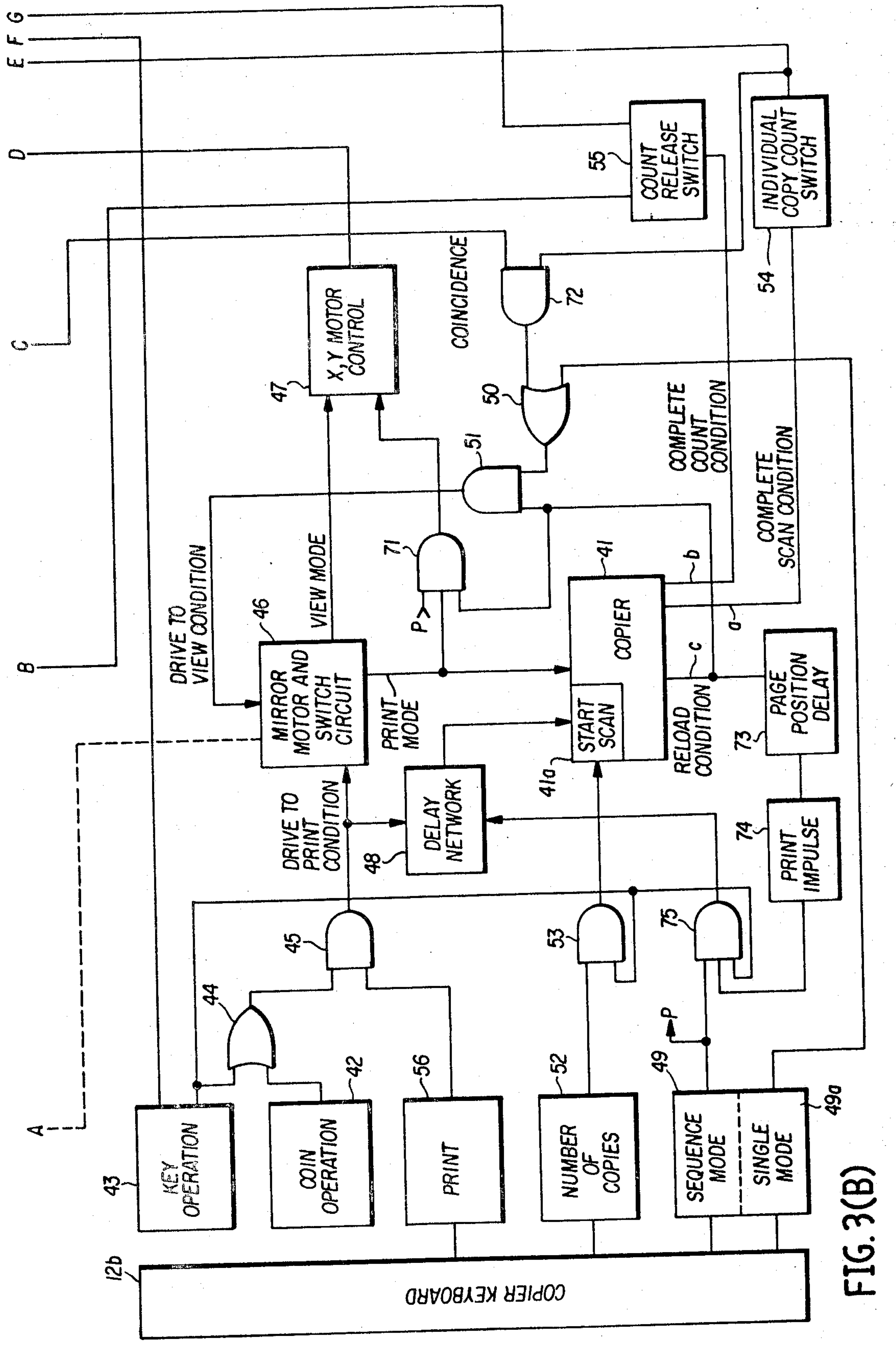

The control system of the present invention is shown in the block diagram of FIG. 3. A portion of keyboard 12 in FIG. 1 is designated by the numeral 12*a* in FIG. 3 as the microfiche and frame selection keyboard. A code is used for identification of the desired microfiche, the code being related to corresponding notches or the like along one edge of the microfiche cards. For example, the code may consist of three sets of digits. The first set may consist of four digits or keys on the keyboard, the second set may consist of five digits or keys, and the third set may consist of three digits or keys. Thus, a specific microfiche card is identified by the selection and depressing of one key from the first set, one key from the second set, and one key from the third set. Each of said keys is separately wired through a buffer stage 31 to the relay equivalent keyboard 32 to actuate the corresponding three relays. These relays function to actuate corresponding card selection solenoids of the microfiche system 33 and to initiate a scan of the microfiche library and selection of the microfiche card having the corresponding edge coding 17*a* (FIG. 2). System 33 then withdraws the selected card from the library and positions it in the projection optics. The entire microfiche system 33 that effects this selection process is, as previously indicated, known in the art.

In addition to the card selection keys, keyboard 12*a* includes two sets of keys for identifying the frame desired on the selected microfiche card. Each card normally consists of seven rows of frames, with each row having 14 frames, herein referred to as the *x* and *y* coordinates of the card, respectively. Therefore, keyboard 12*a* includes *x* and *y* coordinate designating sets of keys, embodying seven *x* coordinate digits and 14 *y* coordinate digits. Each of these coordinates keys is separately wired through buffer stage 31 to corresponding relays in the relay equivalent keyboard 32, and these relays set up *x* and *y* reference signals used by the microfiche system 33 to locate the desired microfiche frame in the projection optics of the system, as is known in the art.

The foregoing microfiche selection system has a viewing mode and printing mode, and mode selection is accomplished through switches 34*a* and 34*b*. With switches 34*a* and 34*b* in the view mode as shown in the drawing, when the user punches in a microfiche card identifying code and the designation of specific *x* and *y* coordinates on the keyboard 12*a*, the relay equivalent keyboard 32 controls the microfiche system 33 to select the indicated microfiche and position the desired frame of the microfiche in the projection optics of the system. An image of the selected frame is thus projected on viewing screen 13 (FIG. 2).

Referring next to the copier, it is indicated by the box designated with the numeral 41, and is controlled by the portion of keyboard 12 in FIG. 1 indicated by 12*b* in FIG. 3. This copier per se may be a well known electrostatic microfiche copier, as previously indicated. Such copiers normally include a copy, or start scan switch 41*a*, which when actuated initiates a scan cycle, wherein the image at 24 (FIG. 2) is scanned and imaged on a photoconductive surface. The resultant electrostatic image is then developed with electroscopic powder and transferred to a receiving sheet as a macro copy printout of the image. These copiers conventionally include a counter and control circuit, whereby a selected number of copies of the image may be automatically reproduced. They also contain appropriate switch circuitry that is actuated at the end of each scan cycle, and at the conclusion of the number of automatically repeated scan cycles corresponding to a preselected number of copies of a single document or frame, and at the conclusion of its programmed operation when it is ready for reloading or receiving another frame or document. From the foregoing, it is readily apparent that one can obtain the following three outputs from copier 41 as indicated in FIG. 3: a signal occurring at the end of each scan cycle for each copy made (line *a*), for actuation of individual copy count switch 54; a signal occurring on the completion of each set of copies (one or more) automatically made of a given microfiche frame (line *b*), for actuation of count release switch 55; and a reload signal occurring when the copier has completed its set or programmed sequence of operation (line *c*), to reset the system to viewing mode or start a copying cycle for the next microfiche frame in the sequence, depending upon the condition of the other controls in the system.

Operation of the copier 41 may be controlled either by a coin or token operated circuit 42, or by a key operated circuit 43. Key operated circuit 43 may include any desired number of key locks each actuated by a different key. Each key lock actuates a different switch to provide a separate line identification to the billing circuit 100, but all key locks energize the same line for operational control of the copier 41. It will be appreciated, of course, that since the purpose of the key operated circuit is to identify the user, one may obviously employ, instead of a key lock, such other identifying devices as coded punched or notched cards, or magnetically or conductively coded cards, or similar, equivalent or analogous devices.

Assuming that a desired microfiche card and frame have been selected and an image of the frame is projected onto viewing screen 13, with mirror 20 in its solid line position (FIG. 2), and the user desires to make one print or copy of that single frame. The user either inserts a coin in the coin circuit 42, or inserts a key in the key circuit 43. The resultant signal is passed by the OR gate 44 to nand gate 45. The user then activates the print circuit 56 by actuating a print key on keyboard 12*b*, which provides a second input signal to gate 45. The resultant output of gate 45 actuates the mirror motor and switch circuit 46 to drive mirror 20 from its solid line position (view mode) to its dotted line position (print mode) (FIG. 2), thereby directing the microfiche frame image from the viewing path to the copying path.

This switch circuit 46 also controls the *x*,*y* motor control circuit 47. When circuit 46 is in the view mode, it activates the *x*,*y* motor control circuit 47 to energize the *x*,*y* motor drive of microfiche system 33 so that a selected microfiche card can be driven on its *x* and *y* axes to a frame position identified by keyboard 12*a*. When circuit 46 goes to print mode, circuit 47 is deactivated to inhibit operation of the *x*,*y* motor drive in system 33, so that a frame cannot be moved or changed during a print or copying cycle. Switches 34*a* and 34*b* are also controlled by the mirror motor and switch circuit 46, and are moved between view and print mode positions by and in correspondence with the circuit 46.

In addition, when circuit 46 goes to print mode, it energizes copier 41 into readiness for operation. Shortly after this occurs, the output of nand gate 45, coupled through delay network 48 is applied to the start scan circuit 41*a* of copier 41 to start a copying cycle.

The copier keyboard section 12*b* contains interlocked sequence mode and single mode selector switch circuit 49, 49*a*. This selector is set in single mode operation unless the sequence mode button on keyboard 12*b* is actuated. In single mode operation, this selector switch circuit applies a signal from circuit 49*a* to OR gate 50, which passes the signal to nand gate 51. After the copier completes its scan cycle, the copier obtains a reload condition, and generates a signal on line *c* that is also applied to gate 51. The presence of these signals causes gate 51 to actuate mirror motor and switch circuit 46 to return to its viewing mode. Mirror 20 is thus returned to its solid line position of FIG. 2, and the switch circuit 46 reenergizes the *x,y* motor control circuit 47, deenergizes the scan system of copier 41, and returns switches 34*a* and 34*b* to view mode. When the printout from copier 41 is completed, the print section of the copier shuts off. With return of switches 34*a* and 34*b* to view mode, another microfiche or frame can be selected by operation of the microfiche and frame selection keyboard 12*a*.

In the foregoing single mode of operation one printout copy was produced. Multiple copies of the single frame can be produced automatically. For this purpose key operation is required. The copier's automatic number of copies circuit 52 is set from the copier keyboard section 12*b*. The number of copies circuit 52 is rendered effective to control copier operation by the presence of a signal from key operation circuit 43 in the nand gate 53. The manner of operation is the same as described above for production of a single copy, except the copier does not generate a reload condition signal until the required number of copies have been produced, hence the mirror motor and switch circuit 46 does not return to view mode until that occurrence.

On completion of each individual scan cycle of the copier 41, a signal is generated on line a to actuate individual copy count switch 54 and deliver a signal to the billing circuit 100. Likewise key actuation of the key operation circuit 43 provides a signal to billing circuit 100, to identify the particular key being used. The operation of the billing circuit in response to these inputs will be described later.

Returning to a consideration of the microfiche and frame selection circuit, it will be recalled that switches 34*a* and 34*b* move between view and print modes with circuit 46. When switches 34*a* and 34*b* are moved to print mode, the *x* and *y* coordinates keys of keyboard 12*a* are each coupled by separate leads through switch 34*a* to binary coding matrix 61, and *x* and *y* coordinates for the microfiche frame identified on the keyboard section 12*a* are each converted to a binary number or designation at the output of this binary coding matrix. The binary designation from matrix 61 for the *x* coordinate is momentarily coupled to the initial *x* coordinate loading network 62 while the switch 34*b* is is momentarily closed to its contact 34*b'*, which sets the *x* coordinate binary counter 63 to that number. Similarly, the binary number or designation from matrix 61 for the *y* coordinate is momentarily coupled to the initial *y* coordinate loading network 65, which sets the *y* coordinate binary counter 66 to that number. As switch 34*b* completes its traverse from view to print mode, it leaves contact 34*b'* and comes to rest on contact 34*b''*, coupling the binary *x* and *y* outputs of matrix 61 to the last *x* and *y* coordinate buffer circuits 64 and 67, respectively. The purpose of the presently described circuitry is to enable the automatic copying of a selected sequence of microfiche frames, and the recording thereof by the billing circuit 100, as will be explained more fully subsequently. In that process the *x* and *y* coordinate counters 63 and 66 will be appropriately stepped to control the changing of the microfiche frame under projection by the microfiche system. However, to be able to control the relay equivalent keyboard 32, the binary counter outputs must be reconverted to a separate line for each number or frame coordinate designation, corresponding to the original input from keyboard 12*a*. Therefore, the binary output of *x* coordinate counter 63 is applied to the *x* coordinate decoding matrix 68, and the resultant seven separate output lines are coupled to the appropriate relays in the equivalent keyboard 32. Likewise, the binary output of *y* coordinate counter 66 is applied to *y* coordinate decoding matrix 69, and the resultant 14 separate lines are coupled to the appropriate relays in the equivalent keyboard 32. In this way, when the print mode is set by switch circuit 46, counters 63 and 66 and buffers 64 and 67 obtain binary designations of the *x* and *y* coordinates selected on keyboard 12*a*, and the decoded outputs of matrixes 68 and 69 correspond identically to the previous input to the relay equivalent keyboard 32 obtained directly from the keyboard 12*a*.

To effect a sequence mode of operation, actuation of a key operation circuit 43 is required. With the desired microfiche card and the first microfiche frame in the sequence selected and projected onto the viewing screen by actuation of the appropriate keys on keyboard 12*a*, the sequence circuit 49 is actuated from the keyboard 12*b* deactivating the single mode circuit 49*a*. Print circuit 56 is then actuated from keyboard 12*b*, which places the system into print mode. Switches 34*a* and 34*b* are moved from view mode to print mode position to inject the *x* and *y* coordinates of the first frame into the *x* and *y* coordinates counters 63 and 66 and their related circuits as aforedescribed, and copying of the first selected frame begins in the same manner as previously described for single mode copying. At this point, the user inserts via keyboard 12*a* a new set of *x* and *y* coordinates designations indicating the last microfiche frame desired in the sequence. This new coordinates designation has no effect on networks 62 and 65 or the counters 63 and 66, because switch 34*b* has passed contact 34*b'* and now engages contact 34*b''*. The present coordinates input is coupled to the last *x* and *y* coordinates buffers 64 and 67, and since these buffers simple reflect any given input, they are changed from the initial coordinates designation to the present one, and provide binary inputs to coincidence circuit 70 identifying the last microfiche frame of the sequence.

Returning to operation of copier 41, when scan of the first microfiche frame is completed, and assuming that only one copy per frame is desired, a signal from the copier on line *b* actuates the count release switch 55 which results in a stepping pulse being applied to the *y* coordinates counter 66. This pulse advances the count by one, and through the *y* coordinate matrix 69 the *y* coordinate setting in the relay equivalent keyboard 32 is changed to activate the next y coordinate relay, and thereby cause the microfiche card to be shifted by microfiche system 33 to place the next frame in the projection position. At the same time a copier output signal on line *a* actuates the individual copy count switch 54 for the billing circuit 100. The copier 41 has also attained a reload condition, providing a signal on line *c*. This signal is delayed at 73 for a time approximately equal to the time required to advance the microfiche frame, and then it actuates the print impulse circuit 74. Gate 75 is now activated by the print impulse, the sequence mode circuit 49, and the key operation circuit 43, to pass a pulse to start scan circuit 41*a* through delay network 48. Copying scan of the next frame is thus commenced.

Since the system is in sequence mode and there was no coincidence signal from circuit 70, gate 51 was not activated and the mirror motor and switch circuit 46 remains in print mode. It was previously mentioned that in single mode operation, the *x,y* motor control circuit 47 remains deactivated while the system is in print mode. In sequence mode however, the *x,y* drive of system 33 most change the projected frame while in the copy mode. Therefore, an activating signal is transmitted to the motor control circuit 47 by gate 71 when a sequence circuit signal is applied thereto (point P to point P) along with a reload condition signal, thereby activating the *x,y* motor drive of microfiche system 33 for the period of time between the occurrence of the reload condition signal and the actuation of the copier's start scan circuit 41*a* (which terminates the reload condition signal).

The foregoing sequence mode of operation continues frame by frame through the sequence of frames selected. After each frame is copied, a stepping pulse advances the *y* coordinates counter 66 by one. When this count reaches the 14th frame on the particular microfiche row identified by the *x* coordinates counter setting, the next stepping pulse resets *y* counter 66 to the one position, and at the same time the *y* coordinates decoding matrix 69 provides a stepping pulse to the *x* coordinates counter 63 to cause that counter to advance by one. The microfiche card is thereby reset to the first *y* coordinates frame on the next *x* coordinates row.

This process of frame printing followed by stepping of the microfiche card to the next frame continues until the count reached in the counters 63 and 66 is the same as the last coordinates values present in buffers 64 and 67. The binary coordinates values present in buffers 64 and 67 and the existing binary coordinates values from counters 63 and 66 are all applied to coincidence circuit 70, and the buffer *x* and *y* coordinates values are constantly compared with the counter *x* and *y* coordinates values for coincidence. When coincidence is obtained, a coincidence signal is applied to nand gate 72. When the copier 41 completes its scan of this last frame, individual copy count switch 54 is actuated providing a second input to gate 72. At this point, gate 72 will pass a signal to OR gate 50, which in turn will pass a signal to nand gate 51. Copier 41 is now in reload condition, and that signal is also coupled to gate 51. Gate 51 will therefore actuate the mirror motor and switch circuit 46 to view condition, thereby deenergizing the copier 41 and placing the projection of the last frame copied on the viewing screen 13. Return of circuit 46 to view mode returns the switches 35*a* and 35*b* to view mode, thereby removing all signals from the buffers 64 and 67. This action also activates a reset circuit (not shown) for counters 63 and 66. The machine is now in condition for the selection of any microfiche card and frame from the library through keyboard 12*a*, and for copying any frame or sequence of frames.

The foregoing sequence mode of operation was described on the basis of producing one copy for each frame. It is apparent that as each frame is copied, multiple copies can be made by use of the number of copies selector 52, and the manner of operation will be apparent in view of the multiple copy operation described in relation to single mode operation.

In the foregoing description it was indicated that three elements of billing information are transmitted to the billing circuit 100. These are: the identity of the microfiche frame copied, by *x* and *y* coordinates information obtained from the coordinates counters 63 and 66; the number of copies made, by a signal from the individual copy count switch 54 each time the copier is operated through a scan cycle; and the identity of the key user when the system is operated by means of the key operation circuit 43. To complete the information required to identify the specific frame copied, one must also have the identification of the particular microfiche card from which the frame is copied, and this is obtained from the microfiche identification circuit 81. Circuit 81 comprises a set of latching relays corresponding to the relay equivalent keyboard 32, and each relay in circuit 81 is actuated by the output of the corresponding relay in circuit 32. Thus, the coded microfiche card identification data used to select the card in the microfiche system 33, is stored in the microfiche identification circuit 81 and transmitted therefrom to the billing circuit 100. The specific card data is retained in identification circuit 81 so long as that selected microfiche card remains in projection position.

When it is desired to change the selected microfiche card, the user actuates a "load" switch on keyboard 12*a* which actuates circuit 82 causing the microfiche system 33 to return the previously selected microfiche to the carousel library 16, and clears the microfiche card identifying switches on keyboard 12*a*. At the same time, circuit 82 resets all the relays in the identification circuit 81. Then the user actuates a "view" switch on keyboard 12*a*, which resets all the keyboard 12*a* *x* and *y* coordinates switches, thereby clearing the relay equivalent keyboard 32 of the previous *x* and *y* coordinates data, and conditions system 33 to search for the microfiche next identified. The user then actuates appropriate keys on keyboard 12*a* to identify the next microfiche card and frame desired, thereby causing microfiche system 33 to search out the desired microfiche card and position the desired frame in the projection optics.

Figure 4:
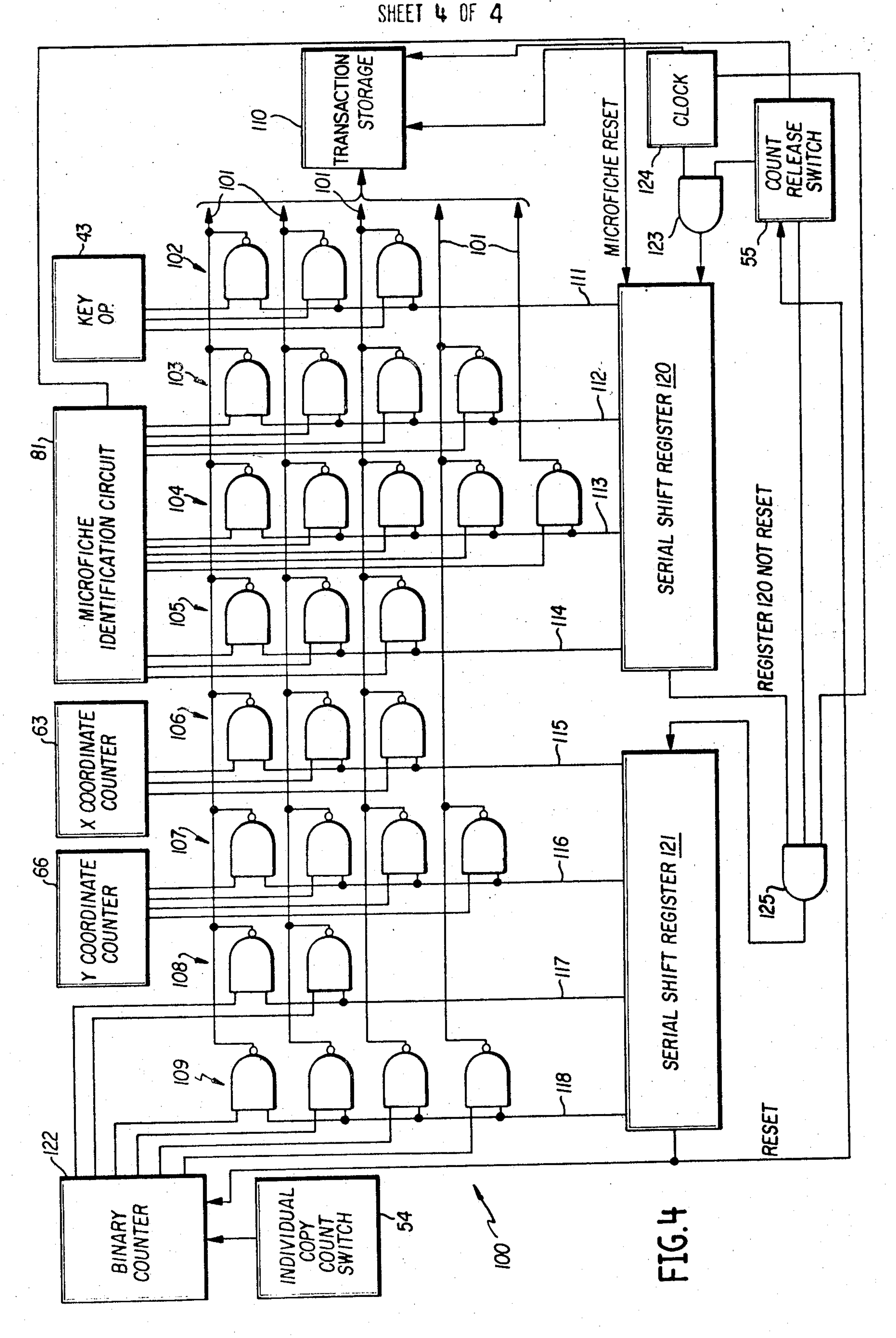
FIG. 4 is a circuit diagram of the billing circuit utilized with said control system.

The billing circuit 100 is shown in detail in FIG. 4. It is illustrated as containing five electrical bus lines 101 feeding a transaction storage unit 110. This transaction storage unit may be of the punch tape, magnetic tape, magnetic core, or any other type, wherein signals on the buses 101 are recorded in a manner that permits later readout, as is well understood in the art. The billing circuit 100 further comprises a number of nand gates shown arranged in eight vertical columns 102 through 109. The various inputs to the billing circuit referred to in connection with FIG. 3 are indicated in FIG. 4, and these include the key operation circuit 43, the microfiche identification circuit 81, the *x* and *y* coordinates counters 63 and 66, the individual copy count switch 54, and the count release switch 55.

Three outputs from the key operation circuit 43 are shown, each representing a switch line operated by a separate key lock. (One may designate "no key," i.e. coin operation, if desired). Each of these lines provides one input to one of the three nand gates in column 102. All of these three nand gates has a second input obtained from one stage of serial register 120 along line 111. If the copier 41 is being operated by a key, one of the three nand gates 102 will be activated at a time when a register signal appears on line 111, thereby providing a signal on the corresponding one of buses 101. That bus is therefore indicative of the particular key used, and that information is recorded in the transaction storage device 110. The three digit code used to identify the microfiche card is applied from microfiche identification circuit 81 to the nand gate columns 103, 104 and 105, one digit per column, and the code is read out on buses 101 when those nand gates are activated by register signals applied sequentially to lines 112, 113, and 114 from separate stages of the register 120. The binary codes identifying the *x* and *y* coordinates of the microfiche frame being copied are applied from counters 63 and 66 to the nand gates in columns 106 and 107, respectively, and this information is read out to transaction storage unit 110 when those nand gates are activated by signals applied sequentially on lines 115 and 116, respectively, obtained from separate stages of serial shift register 121. Each actuation of the individual copy switch 54 is applied to a binary counter 122, and the instantaneous count contained therein is reflected in the nand gates of columns 108 and 109. Thus, the total copy count is read out on buses 101 when the appropriate stages of shift register 121 activate lines 117 and 118 sequentially. Once the count is read out and placed in the transaction storage unit 110, counter 122 is reset by a signal from the last stage of register 121.

At the beginning of a transaction, a user identifies a microfiche card and frame for view, using keyboard 12*a*. This action establishes the card code in nand gate columns 103, 104 and 105 through the microfiche identification circuit 81. Selection of the microfiche card by the microfiche system 33 generates a reset signal for serial shift register 120 fed through the identification circuit 81. If, for example, it is then desired to make several copies of this frame plus the succeeding several frames, the user first inserts his key, and the key identification established at the key operation circuit 43 appears at the nand gates 102. From the machine keyboard 12*b* the user actuates the sequence mode circuit 49 and the number of copies circuit 52, and then actuates the print circuit 56. After copying starts, the user then identifies through keyboard 12*a* the last frame *x* and *y* coordinates desired to be copied in the sequence. Each scan cycle of the copier actuates the individual copy count switch 54, and the instantaneous accumulated count in counter 122 is reflected in the nand gates 108 and 109. In print mode, the *x* and *y* coordinates of the frame currently being copied are reflected in nand gates 106 and 107. Upon completion of the last copy scan for the first frame in the sequence, the count release switch 55 is actuated, causing nand gate 123 to pass clock pulses from clock 124 to serial shift register 120. Since at this juncture this register is in reset condition as a result of the positioning of a new microfiche in projection position, the register is caused to shift with each clock pulse and energize lines 111, 112, 113 and 114 in sequence, thereby reading out the key and microfiche identification on buses 101. Count release switch 55 also energizes the transaction storage unit 110, which then records this strobing action readout keyed to the clock reference pulses from clock 124 which are also applied to the transaction storage unit. When register 120 has shifted to its last stage, that stage is no longer in reset state, and that condition along with the actuated count release switch, opens nand gate 124 to pass clock pulses from clock 124 to serial shift register 121. This register then strobes lines 115, 116, 117 and 118 to read out the *x* and *y* coordinates of the microfiche frame and the number of copies made, for recording in the transaction storage unit 110. Shifting of the last stage of register 121 provides a reset signal which resets counter 122 and the count release switch 55. This reset signal, or resultant reset of count release switch 55, is used as the stepping signal for the *y* coordinate counter 66 in FIG. 3, thereby initiating a change in position of the microfiche card to locate the next microfiche frame in the projection optics. When this next frame is copied and the required number of copies are produced, count release switch 55 is again actuated by the copier. Since the microfiche card was not changed for this set of copies, there was no reset signal applied to register 120, and although gate 123 passes the clock pulses, serial shift register 120 does not respond to the clock pulses. However serial shift register 121 is designed for automatic reset, and gate 124 does pass the clock pulses to this register to strobe the columns of nand gates 106, 107, 108 and 109, to record the current frame identification and number of copies made. Thus, as operation continues, the fixed information of key identification and microfiche card identification is not repeated in the storage unit 110, but frame identification and number of copies data are continually recorded. Obviously, at such time as the user may select another microfiche card, on the first set of copies made therefrom, its identification along with key identification will be recorded in the transaction storage unit 110.

Having thus described one embodiment of the present invention, it should be understood that this embodiment is intended to be illustrative only. It will be apparent to those skilled in the art that alternative relationships between functional components are possible, and that other modifications and variations may be practiced. Accordingly, it is intended that the scope of the present invention not be viewed as limited to this embodiment, and that such modifications and variations as are embraced by the spirit and scope of tbe appended claims are contemplated as being within the purview of the present invention.

We claim:

1. In a microfilm copier having optical projection means, means for identifying a desired unit having a plurality of fixedly arranged individual microfilm image frames and for identifying a desired frame by digital codes and selecting the desired unit from a library and positioning said desired frame in said projection means to project an image thereof to a copier, and selectively actuatable means for initiating a copying operation; the improvement of combining an operations recording system with said copier comprising means responsive to the unit identifying means for holding the unit identifying code, means responsive to the frame identifying means for holding the frame identifying code, a counter responsive to the number of copies made, means responsive to the completion of a frame copying transaction for reading out the unit and frame codes and count in the counter and resetting the counter, a storage means, and means for coupling the readout to said storage means.

2. In a microfilm copier as set forth in claim 1, said selectively actuatable means including a plurality of separately actuatable means each responsive to a separate key means, said recording system including means responsive to said separately actuatable means for identifying the key means used, said read out including said key means identification.

3. In a microfilm copier as set forth in claim 1, said unit being a microfiche card.

4. In a microfilm copier having optical projection means, means for identifying a desired unit having a plurality of fixedly arranged individual microfilm image frames and for identifying a desired frame by digital codes and selecting the desired unit from a library and positioning said desired frame in said projection means to project an image thereof to a copier, and selectively actuatable means for initiating a copying operation; the improvement of combining an operations recording system with said copier comprising: an information storage device, a plurality of electrical bus lines coupled to said storage device each identifying a separate recording position in said storage device, a plurality of banks of electrical gates, in each bank each gate having its output coupled to a separate one of said bus lines, all gates in each bank having a common input line, the unit identification code means being coupled to at least one bank of gates with a separate line for coupling different digital code elements to an input of different ones of the gates, the frame identification code means being coupled to at least a second bank of gates with a separate line for coupling different digital code elements to an input of different ones of the gates, and means responsive to the copier upon completion of a frame copying transaction for sequentially energizing each of said common input lines, whereby each bank of gates is triggered in sequence to provide momentary output signals on said bus lines corresponding to the informational inputs carried by the gates of each bank as the common line of each bank is energized.

5. In a microfilm copier as set forth in claim 4, a counter responsive to the copier for counting the number of copies made, the counter being coupled to at least a third bank of gates with a separate line for coupling different counter output stages to an input of different ones of the gates, said means for sequentially energizing said common input lines also resetting said counter.

6. In a microfilm copier as set forth in claim 5, said selectively actuatable means including a plurality of separately actuatable means each responsive to a separate key means, said plurality of separately actuatable means being coupled to at least a fourth bank of gates with a separate line for coupling different ones of said separately actuatable means to an input of different ones of the gates.

7. In a microfilm copier as set forth in claim 6, said unit being a microfiche card.

8. In a microfilm copier as set forth in claim 6, said means for sequentially energizing each of said common input lines including shift register means with each of said common input lines being coupled to a separate stage output of said shift register means.

9. In a microfilm copier as set forth in claim 8, means responsive to the completion of a frame copying transaction of the copier for coupling a clock pulse source to said shift register means to cause it to step from stage to stage.

10. In a microfilm copier as set forth in claim 9, said shift register means having two parts, a first part having its stages coupled to the common input lines of said first and fourth banks of gates, and a second part having its stages coupled to the common input lines of said second and third banks of gates, said second part having automatic reset means, said first part having reset means actuatable by said unit selecting means, whereby said common input lines of said first and fourth banks of gates are energized once after the unit is changed, and said common input lines of said second and third banks of gates are energized on the completion of each frame copying transaction.

11. In a microfilm copier as set forth in claim 10, said unit being a microfiche card.

* * * * *